United States Patent [19]

Mager

[11] Patent Number: 5,331,338
[45] Date of Patent: Jul. 19, 1994

[54] WEB STEERING FOR AN IMAGE RECORDER

[75] Inventor: Donald V. Mager, Mendota Heights, Minn.

[73] Assignee: Printware, Inc., Saint Paul, Minn.

[21] Appl. No.: 828,020

[22] Filed: Jan. 30, 1992

[51] Int. Cl.$^5$ .......................... H01N 1/21; B41J 2/435
[52] U.S. Cl. ...................................... 346/108; 346/136
[58] Field of Search ........................ 346/108, 76 L, 1.1, 346/136, 160; 358/296, 298, 300, 302

[56] References Cited

U.S. PATENT DOCUMENTS

| 4,727,381 | 2/1988 | Bille et al. | 346/108 |
| 4,937,664 | 6/1990 | Chiku et al. | 346/160 |

Primary Examiner—Mark J. Reinhart
Attorney, Agent, or Firm—William C. Fuess

[57] ABSTRACT

A photosensitive medium, normally a diazo printing plate or photopolymer-based proof, is exposed in a series of exposures each of a small rectangular area. Typically several linearly-arrayed Deformable Mirror Devices (DMD's) each spatially encode a light beam in order to expose corresponding pixels within corresponding regions of the medium. Between successive exposures, the several DMD's are moved to a new position relative to the medium along a first, x, axis so that new exposures of new regions can be made. Normally the arrayed DMD's are moved relative to the imager's frame by a screw drive. There is an additional, separate relative movement between the DMD's and the medium along another, perpendicular, y, axis. Normally the medium is moved relative to the imager's frame by nip rollers. In order to provide a required precision in registering successively imaged regions of the medium along either or both axis, reference marks are exposed directly on the medium. After each movement of the medium along either or both axis, these reference marks are sensed, typically by four-quadrant photodetectors, and errors in the repositioning of the medium are determined. To compensate for these errors, the nip rollers are adjusted by a servomechanism. The medium is held by a cyclic pressure pad while it is imaged. So proceeding, the entirety of a large photosensitive medium is imaged in successive regions along two perpendicular axis while errors in image alignment and registration are substantially reduced.

17 Claims, 4 Drawing Sheets

WEB STEERING FOR AN IMAGE RECORDER

REFERENCE TO RELATED PATENT APPLICATIONS

The present patent application is related to U.S. patent applications Ser. Nos. 811,807 for an IMAGING DEVICE; 811,806 for a HIGH RESOLUTION IMAGING DEVICE; and 811,797 for a FAULT TOLERANT IMAGING DEVICE, each to the selfsame inventors of the present application and filed on Dec. 20, 1991. The present patent application is also related to U.S. patent application Ser. No. 828,021 for a COLOR IMAGING DEVICE, which application has as a co-inventor the inventor of the present application and which application is filed on an even date herewith. The contents of the related applications are incorporated herein by reference.

BACKGROUND OF THE INVENTION

1. Field of Invention

The present invention generally relates to image recorders, i.e. devices which record images on photosensitive media, examples of which devices include laser printers, plotters, and platesetters.

The present invention particularly relates to improved registration between successive images produced in and by such an image recorder.

2. Background of the Invention

Typically image recorders are constructed wherein a laser beam sweeps across a photosensitive medium while the medium moves slowly in a direction perpendicular to the primary direction of laser beam scanning. Such imager recorders are limited when diazo or photopolymer media are to be imaged (e.g. printing plate material) with ultraviolet light inasmuch as lasers suitable for generating the large intensities of ultraviolet light required are not economically available.

In the above-mentioned co-pending U.S. patent application Ser. Nos. 811,807 for an IMAGING DEVICE; 811,806 for a HIGH RESOLUTION IMAGING DEVICE; and 811,797 for a FAULT TOLERANT IMAGING DEVICE it is taught that small rectangular images may be created by the use of Deformable Mirror Modules, such as are also described in U.S. Pat. No. 5,028,939 to Hornbeck, et al., to deflect a beam of intense ultraviolet light generated by an incandescent, non-laser, light source.

The co-pending related patent applications also disclose an adjustment of the optical path of the imaging in order to improve the spatial registration, one region to the next, of each of a number of successively exposed image regions. The optical path adjustment preferably transpires by use of a tiltable glass plate. The adjustment compensates for positional errors in the location of the successive, and successively exposed, image regions.

The optical path adjustment is performed responsively to sensed registration marks. These registration marks are normally emplaced on diazo printing plate media or photopolymer-based proofing materials—the recording of which immediately produces a visually sensible change—at the same time, and through the same optical path, as the successive image regions are successively exposed. The recording of the registration marks is with one optical system, and the later sensing of the recorded registration marks is with another optical system.

It would be useful if, in addition to the compensation of the optical path in the exposures of the successive images in order to accord for inaccuracies in the movement of the medium, any positional errors resultant from the movement of the medium could be minimized, and prevented from accumulating. Accordingly, some feedback control of the transport of the medium in order to minimize positional errors—as well as (presumptively optical path) compensation for uneliminatable positional errors—would be desirable.

SUMMARY OF THE INVENTION

The present invention contemplates (i) both imaging and marking a photosensitive medium, or web, regionally, and then (ii) controlling a positional movement of medium—which movement transpires in order that successive regions of the medium may be successively imaged (and marked)—in accordance with the marking. The present invention further contemplates a regional pressurized holding of the medium in order to render it regionally stable, and motionless, while it is regionally imaged and marked.

The dual objectives of the present invention are to minimize positional errors in transport of the medium, and to also to stabilize the medium along an axis of its exposure, so that the (i) successively imaged successive regions of the image are in exacting registration, one region to the next, and (ii) the image size and focus is always maintained constant.

In accordance with one, preferred, embodiment of the present invention, an active steering of medium is realized by positional control of nip rollers which serve to move the web (plate material or proofing material) into the imaging area. The nip roller positional control is based on feedback obtained from sensing of the registration marks placed on the medium.

Still furthermore in accordance with the present invention, at the location of the medium's imaging it passes proximate to a plate which cycles in position relative to the medium. When the medium is moving, the plate moves away from the medium to relax the tension in the medium. When the medium stops, the plate moves into pressured contact against the medium to slightly stretch it and ensure that it is exactly positioned along the optical axis of exposure.

These and other aspects and attributes of the present invention will become increasingly clear upon reference to the following drawings and accompanying specification.

DETAILED DESCRIPTION OF THE PREFERRED EMBODIMENT

Figure 1:
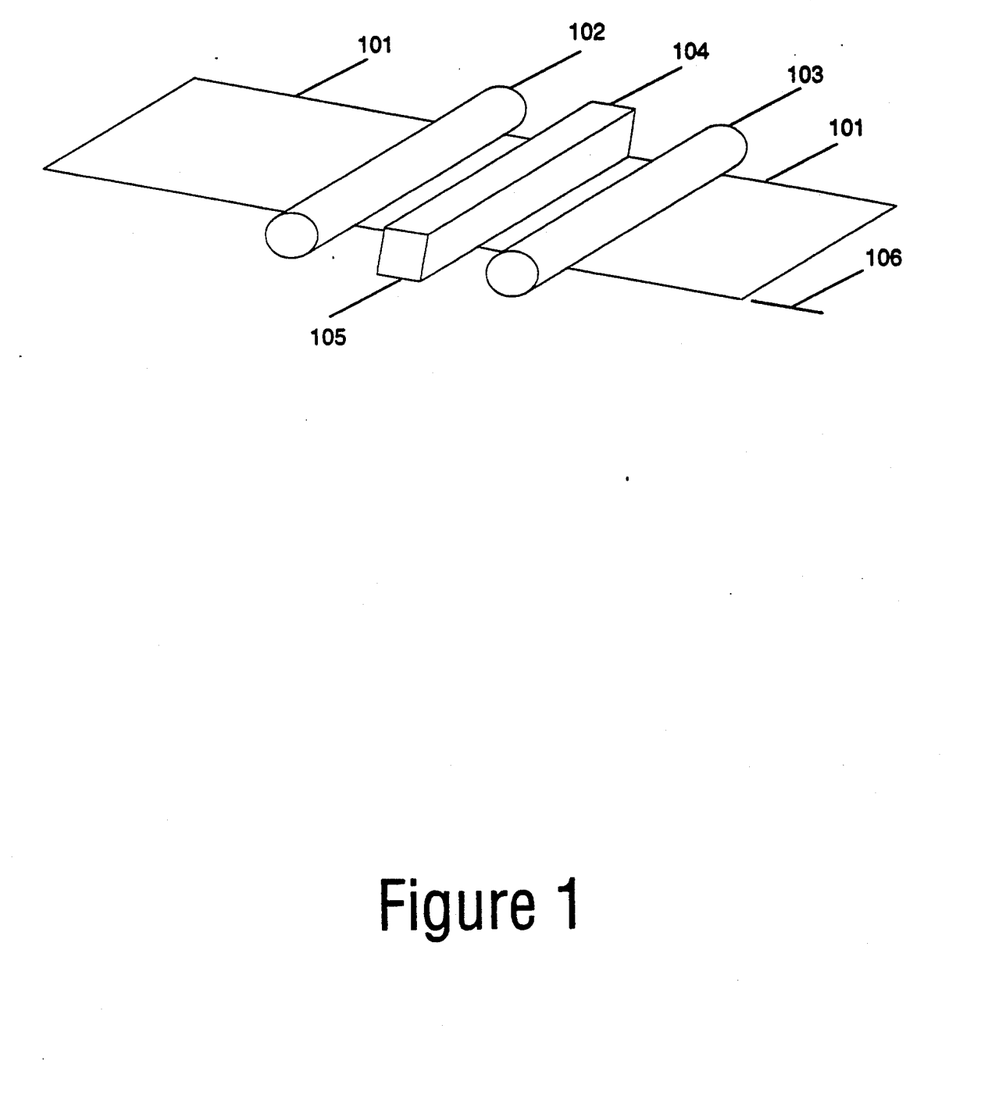
FIG. 1 is a diagrammatic view showing the imaging module of an image recorder in use to (i) image and to (ii) mark a color-sensitive medium.

An overall view of an image recorder in accordance with the present invention is shown in FIG. 1. A photosensitive and color-sensitive medium 101 (shown in phantom line), typically a printing plate or proofing material, is moved by nip rollers 102 and 103 through an imaging area. The medium 101 is supported on either side of the imaging area so as to retain dimensional stability. Within the imaging area is a linear array of many light modulators, each containing one Deformable Mirror Device (DMD) chip and associated optics. These are all contained within enclosure 104, which enclosure 104 constitutes an imaging module.

Each DMD chip exposes a rectangular area of the medium 101. The medium 101 is stationary during exposure. During exposure, a series of images are created. In one embodiment, the images are contiguous. Sufficient DMD chips are used so that an entire line, e.g. 32", of the image can be created. In another embodiment, the images are separated by a few inches. For example, if the imaging distance is 32" and the DMD chips are separated by 3.2", there would be ten such chips. If the image area of each exposure is 0.32"×0.5", with the 0.32" dimension being parallel to the 32" distance, then ten exposures per band would be required.

A bar or enclosure or imaging module 104, containing the various DMD chips and associated optics moves between exposures, and remains stationary during exposures. Arrow 105 shows the direction of this movement along a first, x, axis between exposures. Following each exposure, the imaging module 104 is moved relative to medium 101 (e.g., 0.5") and stopped, and the process is repeated.

Arrow 106 shows the direction of medium 101 movement relative to the imaging module 104 along a second, y, axis. The relative movement in the second, y, axis direction is typically (although not necessarily, nor invariably) accomplished only after all such successive exposures along the x axis as constitute, in aggregate, one complete band of the overall color image have been accomplished.

It is essential that the various exposures in either axis should line up with each other. For the preferred embodiment of the invention mentioned above and shown in FIG. 1, part of this requirement involves moving the DMD chips exactly the proper amount in the x-axis direction indicated by arrow 105 (FIG. 1) between exposures. This is accomplished via (1) reference to a linear encoder (not shown) which monitors the movement of the imaging module 104 containing the DMD chips. This is also accomplished by (2) movement of a glass plate in the optical path of each DMD chip. A servo system controls the tilting of each of these plates. Depending on the amount of tilt, the plate thickness, and the refractive index of each plate, the image can be adjusted in its position slightly. At the time of manufacture the system is characterized so that whatever manufacturing variations and errors present within the optical system are compensated for via the initial, neutral, alignment of the glass plates.

It is also desirable that the movement of the medium 101 between exposures (relative to the DMD chips and the imaging module 104) should be, insofar as is possible, of precisely the correct amount. This movement is indicated by arrow 106 in FIG. 1.

Precision in this movement is a subject of the present invention, as hereinafter discussed. However, for the moment it should be considered that imagers that use nip rollers, as is the case in the preferred embodiment of the present invention, are not capable of perfect precision even when the action of the nip rollers is subject to feedback control, as hereinafter discussed. Accordingly, improved precision in the repositioning of medium 101 is obtained by (1) monitoring the degree of medium movement, and (2) compensating for errors in this movement by tilting the aforementioned glass plates about an axis that is perpendicular direction to the axis of tilt that is described above.

It is the property of various diazo and other photopolymer media that an image is immediately created when each medium is exposed to light, preferably to ultraviolet light. This property of these media is utilized to insure that proper registration of individual rectangular image areas is maintained over the entirety of a large image, e.g. over the image area of a large printing plate or proof. Color-sensitive media, typically film or paper, does not enjoy the advantage of the immediate creation of an image.

In accordance with the present invention, a marking system images pinpoint registration marks on the medium, which registration marks are either (i) mechanical deformations of the medium, or (ii) optical exposures of a layer, or region, of the media that undergoes an immediately detectable photochemical change immediately upon exposure. If the (ii) optical exposures are of a region (as opposed to a layer) then each such region is normally located near an edge of the plate after each movement of the medium.

It is preferred that a pinpoint hole (a mechanical deformation of the medium) should be optically burned into the medium at each position of the medium, and upon the occasion of at least one, if not all, successive color exposures.

Split four quadrant photodetectors are preferred for monitoring the positions of the (preferably burned pinhole) registration marks immediately after each movement. Another set of photodetectors monitor the positions of the registration marks after many such movements, e.g. ten (10) such movements. By knowing the interval between one (1) and between ten (10) such movements of the medium, whatever errors there are in movement are known, and are compensated for via x and/or y (parallel to and/or perpendicular to the direction of medium movement) tilting of the glass plate in the path of each optical system.

It should be understood that there are at least two different, and separate, registrations and compensations performable in accordance with the present invention. In a first embodiment of the invention, no movement of the DMD chips in the direction indicated by arrow 105 is required, and sufficient images are created with each exposure so that they all line up with each other. This joining of the images could occur immediately, or more preferably the images will lineup after some movement of the medium. It is more convenient to have the images displaced from each other by both x and y distances, so that individual optical systems do not crowd each other. When images are being created near the leading edge or trailing edge of the plate, only some of the optical modules are used. At other times, all of them are used, and the data used for each chip is taken as appropriate for the region being imaged.

In an alternative embodiment of the invention, fewer DMD chips are used, and movement of the imaging module 104 containing the DMD chips is used to image the entirety of the plate area. This embodiment is less expensive than the first, but slower in terms of imaging speed.

The emphasis in the present invention is not to exactingly control the movement of the medium or (in the case of the second embodiment) of the DMD chips. Rather, it is based on knowing the exact positions of various images, via characterization (measurements made at the time of manufacture) and calibration (measurements made by the imager itself periodically), and using this information to slightly adjust image positions as the images are made.

It is well known that images passing through a glass plate are translated slightly if the plate is tilted. This occurs because of the refraction of light within the plate. The movement of a glass plate is preferable to the movement of a mirror or other device, because a large movement of the glass plate results in a very small movement of the resultant image. Because of this, very precise image placements are obtainable, without needing the same degree of precision in the system which monitors the glass plate movement. However, a system could also be built which would move a mirror or lens or DMD device.

Figure 2:
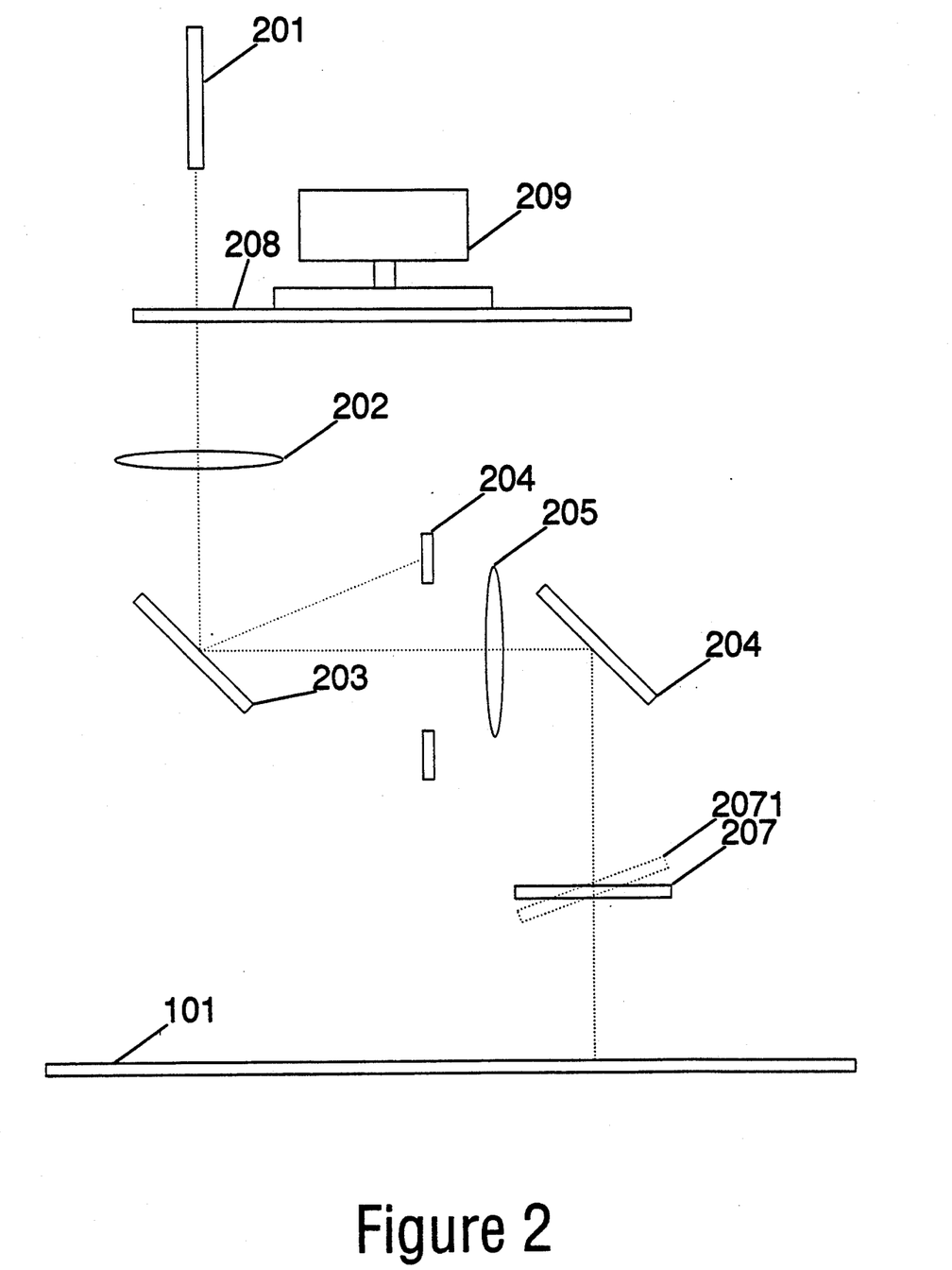
FIG. 2 is a diagrammatic view showing the imaging optical system surrounding a single DMD chip, together constituting one light modulator, out of typically several such light modulators that are within each imaging module shown in FIG. 1.
Figure 3:
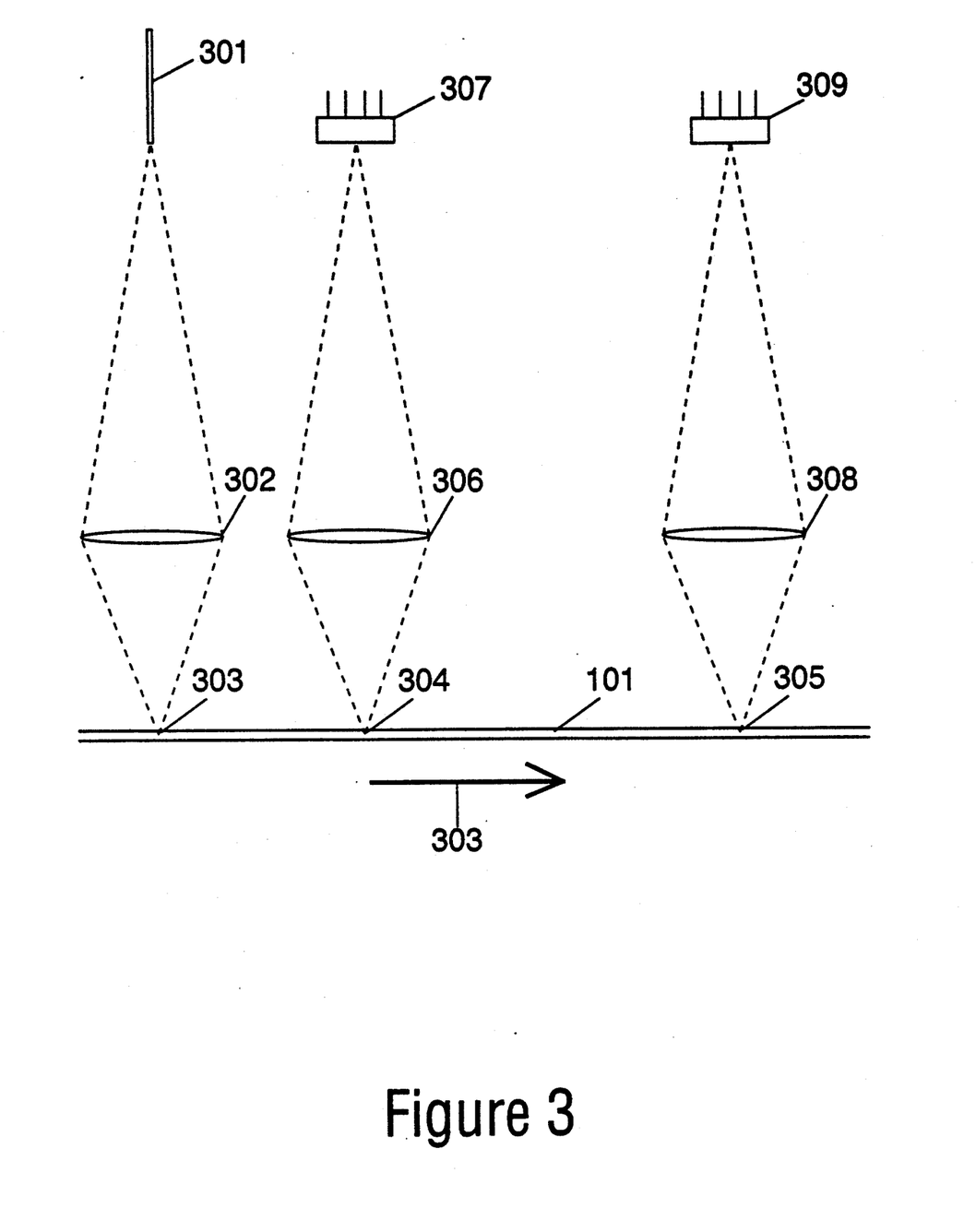
FIG. 3 is a diagrammatic view showing the mechanism for making, and for sensing, reference marks on an imageable medium within an image recorder.

In FIGS. 2 and 3 it should be understood that an optical shutter controls the flow of light into each of various fiber optic bundles. In FIG. 2 the fiber optic bundle 201 receives light from a mercury-xenon lamp (not shown). The use of fiber optic bundles permits a plurality of imaging modules to all draw light from the same lamp. The optical system in FIG. 2 is a dark field illumination system, as is previously known and as is described, inter alia, in U.S. Pat. No. 5,049,901 to Gelbart. The duration of each exposure is perhaps 0.15 second. The shutters close while the DMD chips (together with associated optical components) are moved, and/or the medium moves. During this brief period of time the DMD's cool, thus permitting higher instantaneous power levels during imaging.

The light emerging from the fiber optic bundle 201 is approximately collimated by lens 202, and directed towards Deformable Mirror Module (DMD) chip 203. This chip contains a large array, e.g. 500×700, of mirrors. Those mirrors which are undeflected direct light through stop 204 and through lens 205. Those mirrors which are in the deflected (or "on") state direct light outside the area of stop 204. The light which passes through lens 205 is folded by optional mirror 206, and directed towards plate or proofing media 101. Its exact position on this media is adjusted the degree of tilt of glass plate 207. When this plate is tilted, the position of the image on the printing plate 101 is adjusted slightly, as is indicated by the glass plate 207 being moved to a new position, 2071.

A filter wheel 208 is inserted in the optical path. This insertion may be at various points, and is not limited to the position immediately after the fiber optic light source. It is rotated by a stepping motor 209 so that the appropriate filter (red, green, or blue) is selected. By using each filter in succession, with appropriate data for that color being used, a full color image can be created.

In FIG. 3, fiber optic strand 301 takes light from the same light source as is used by other optic modules. It images it via lens 302 onto spot 303 on medium 101. The amount and strength of the light source channeled via optic fiber strand 301 is normally much greater than that channeled by fiber optic strand 201 (shown in FIG. 2) and is, in any case when focused by lens 302, sufficient to burn a pinhole in the medium 101.

Previously imaged spots on medium 101, e.g. spots 304 and 305, are sensed. Lens 306 images spot 304 onto four quadrant photodetector 307, and lens 308 images spot 305 onto four quadrant photodetector 309. For each of these photodetectors, the relative currents in each of the four quadrants is a measure of the degree to which the spot (304 or 305) is centered relative to its desired position.

A standard algorithm converts the relative four currents into positional error information. This information is obtained in this way: for each type of medium to be used, known positional errors are introduced and the results measured. By reference to this data, comparison is made between the reference data and that obtained from unknown positional errors. In this way an estimate of the positional error is made.

Photodetector 307 measures the positional error resulting from a single step of medium movement. This is measured very precisely, but some small amount of error may be present. To prevent these small amounts of error from building up and becoming significant, the registration marks are also monitored after many such steps, e.g. ten (10) such steps. This is accomplished by lens 308 and photodetector 309. By considering the outputs of both systems, the exact position of the medium is known with greater precision than is possible with just a single system (lens 306 and photodetector 307). In general, this position is not the exact position which is desired, but is close enough so that the tilting of the glass plates can be used to adjust the position of each image to its ideal location.

In accordance with the present invention, the sensed position of the registration marks may be used in lieu of, or in addition to, the compensatory adjustment of the optical imaging path to also control the pinch rollers 102, 103 (shown in FIG. 1) so as to cause the medium 1010 to be more accurately positioned for the imaging of successive regions. In other words, the optical path compensation system of the present and related inventions notwithstanding, it is desirable to minimize errors both individual and cumulative in positioning of the medium.

In accordance with the present invention, the registration mark sensing provides feedback as to whether or not the medium is steered straight or not during its successive cyclic repositioning along the direction of the axis 106 (shown in FIG. 1). The present invention provides a means of correcting the movement of the medium if errors in its movement are detected.

Figure 4:
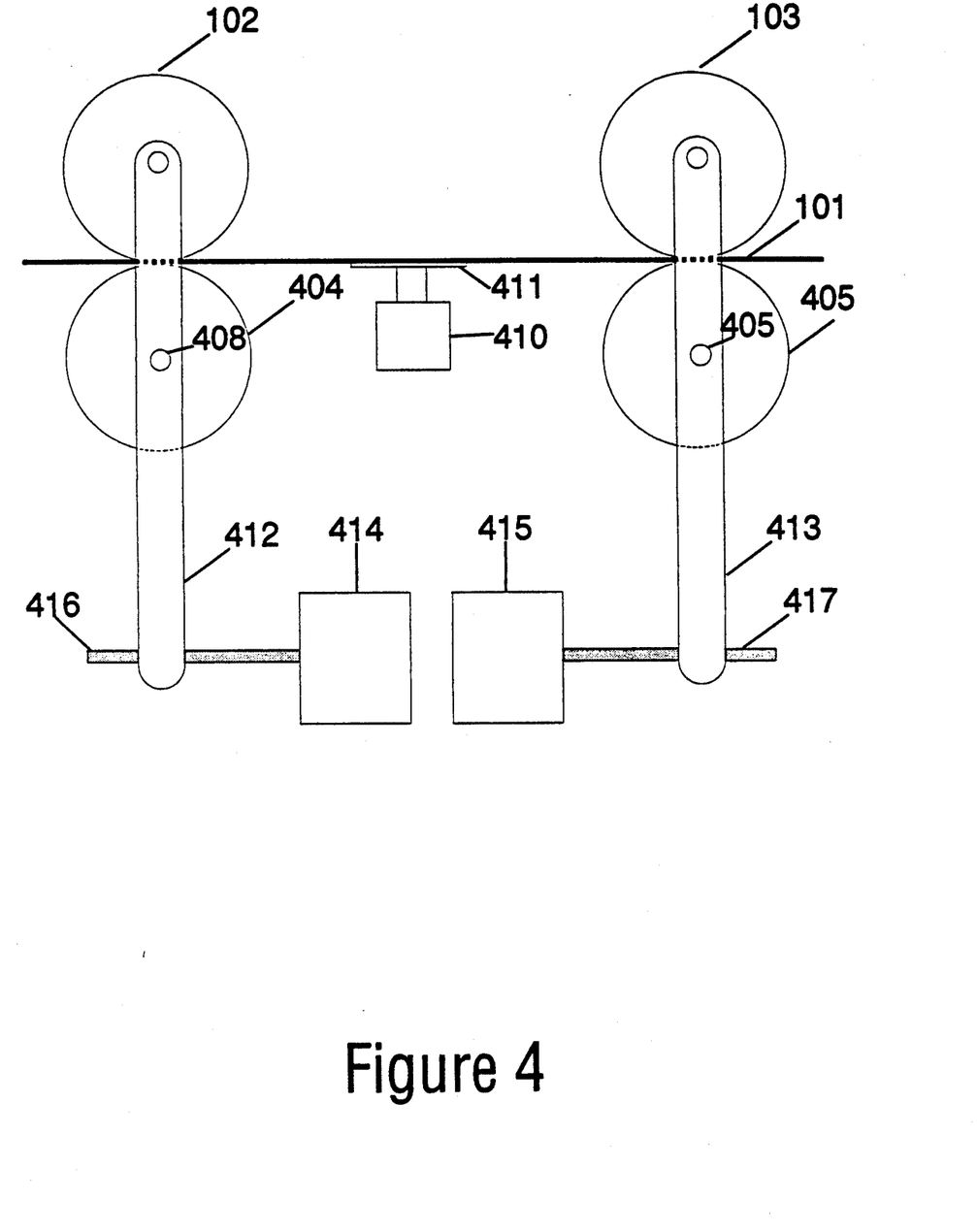
FIG. 4 is a detail side view, at an expanded scale relative to FIG. 2, of the web steering and web clamping mechanisms in accordance with the present invention in use in the image recorder of FIGS. 1 through 3.

FIG. 4 shows a partial side view of the imager previously seen in FIGS. 1 and 2 at an enlarged scale. The media 101 is moved between pairs of nip rollers: upper nip rollers 102 and 103, and lower nip rollers 404 and 405. At least one of each pair (102–404 and 103–405) is driven by a stepping motor and drive train (not shown). Preferably each of the rollers is so driven.

Exposure of the medium takes place in the region between rollers 102 and 403. Stepping motors 414 and 415, respectively coupled to threaded rods 416 and 417, engage a threaded part in assemblies 412 and 413. One of the bearings 406 and 408 is fixed (e.g. bearing 408), and one of bearings 407 and 409 (e.g. bearing 409) is likewise fixed. By turning either stepping motor 414 or 515 or both stepping motors, the relative alignment of the two nip rollers in each pair can be altered. Accordingly, the steering of the plate material (or other web medium) is altered.

The bearings (not shown) on the opposite end of the nip rollers 102,403 and 103,404 may be identical to the end depicted in FIG. 4, or all of the bearings may be fixed. An identical system is preferable inasmuch as symmetry of the nip rollers can be maintained.

The stepping motors are connected to a control system, typically one that is based on a microprocessor, that controls the web steering so as to obtain the straightest possible web movement. The feedback loop is straightforward, and adaptive. It simply involves moving the pinch rollers in a manner that cumulative feedback control history shows will have a optimal effect upon the positioning of the web.

Further in accordance with the present invention, the medium, or web, 101 is held while it is imaged. During the movement of the medium 101, solenoid 410 is energized, pulling pressure plate 411 away from the medium. When the medium 101 stops, solenoid 410 is released, so that a spring (not shown) allows the pressure plate to return upwards until it hits a stop (also not shown). This pressure plate 411 slightly stretches the medium 101, and insures that the vertical position of the medium is correct and reproducible.

In accordance with the preceding discussion, it will be recognized by a practitioner of the art of imager design, and web transport, that the principles of the present invention are susceptible of being realized by diverse structures. In one alternative embodiment of the invention, various registration marks are optically exposed on the medium in areas outside of the imaged region. Areas so located are well known outside the printing region in printing plates. These are often used to control halftone dot gain and to check for registration between the various colors of image.

The marked areas must be capable of immediately undergoing an optically detectable change upon marking with a light beam. Diazo printing plate media, or photopolymer-based proofing materials, exhibit this capability. If necessary to the type of imager (i.e., a color imager), such areas are attachable to the color film or paper that is otherwise imaged by diverse mechanical means including mounting to a common substrate.

The registration marks made by the system of the present invention will not interfere with the normal imaging and printing process. An alternative to the individually adjustable glass plate method disclosed above is to have each DMD module adjusted for exact alignment with adjoining images. Then the positioning which is done is with regard to the entire assembly of many DMD and optics modules.

In accordance with the preceding explanation, diverse means of implementing the principles of the present invention will suggest themselves to practitioners of the electromechanical, and imager, design arts. For example, the positioning of either (i) the imaging module 104, or (ii) the glass plate 207 or other optical-path-altering element could be done in a variety of ways, one of which being to have multi-axis voice coils on each end of the assembly. These voice coils would move the (i) imaging module, and/or (ii) the glass plate, to compensate for a variety of errors, including plate or medium thickness and alignment of registration marks. Those skilled in the art will recognize that many other variations are possible within the scope of this invention.

In accordance with the preceding explanation, the present invention should be interpreted broadly, and in accordance with the following claims, only, and not solely in accordance with that particular embodiment within which the invention has been taught.

What is claimed is:

1. In an imaging apparatus for imaging successive regions of an energy-sensitive medium with an energy beam, a mechanism for positionally transversely guiding the medium into positional registration to the energy beam so that each of a plurality of successive regions of the repositioned medium may be imaged by the energy beam, the imaging apparatus positional registration mechanism comprising:

a frame;

marking means affixed to the frame for recording optically detectable registration marks upon the energy-sensitive medium at a region thereof;

transport means affixed to the frame for moving successive regions of the medium into position transversely relative to the energy beam and relative to the frame so that each of a plurality of successive regions of the repositioned medium may be imaged by the energy beam, the transport means being controllable in its movement of the medium transversely relative to the energy beam so as to more precisely establish the positioning thereof; and regional image registration control means affixed to the frame, and responsive to and optically detecting the registration marks of a one imaged region of the energy-sensitive medium at a time after the medium has been moved transversely relative to the energy beam, for controlling the transport means so that positional errors in the repositioning of the medium are reduced, and so that each successively-imaged region of the image is in better registration, one region to the next.

2. The imaging apparatus registration mechanism according to claim 1 wherein the marking means comprises:

an optical stage means for generating a signal beam representing (i) an image to be recorded on the energy-sensitive media in a portion of its area, and (ii) the optically detectable registration marks;

wherein the registration marks are optically recorded by a same means as is otherwise and additionally used for imaging successive regions of the energy-sensitive medium.

3. The imaging apparatus registration mechanism according to claim 2 wherein the optical stage means comprises:

a deformable mirror device.

4. The imaging apparatus registration mechanism according to claim 2 wherein the optical stage means comprises:

an array of deformable mirror devices sufficient to generate at a single time the signal beam that records the energy-sensitive medium in the portion of its area.

5. The imaging apparatus registration mechanism according to claim 2 wherein the optical stage means comprises:

one or more deformable mirror devices sufficient in aggregate to generate at a single time a signal beam that records the energy-sensitive medium in a part of the portion of its area; and a drive means, affixed to the frame, for stepwise positioning the one or more deformable mirror devices relative to the energy-sensitive medium so that the signal beam, as generated at successive positions of the one or more deformable mirror devices, records the energy-sensitive medium in successive parts until the entire portion of its area is recorded.

6. The imaging apparatus registration mechanism according to claim 1 wherein the transport means comprises:
a rotational drive means, affixed to the frame, for rotating against the energy-sensitive medium in order to position it relative to the frame and transversely relative to the energy beam.

7. The imaging apparatus registration mechanism according to claim 6 wherein the rotational drive means comprises:
a plurality of nip rollers.

8. The imaging apparatus registration mechanism according to claim 7 wherein the regional image registration control means comprises:
sensing means, affixed to the frame, for sensing the optically-recorded registration marks; and
a servomechanism, affixed to the frame, responsive to the sensed registration marks for physically moving at least one of the plurality of nip rollers so as to alter the path of the energy-sensitive medium during its repositioning.

9. The imaging apparatus registration mechanism according to claim 8 wherein the means for sensing comprises:
a photodetector.

10. In an imaging apparatus for imaging successive regions of an energy-sensitive medium with an energy beam, a mechanism for positionally guiding the medium into positional registration to the energy beam so that each of a plurality of successive regions of the repositioned medium may be imaged by the energy beam, the imaging apparatus positional registration mechanism comprising:
marking means for recording registration marks upon the energy-sensitive medium at a region thereof;
transport means for moving successive regions of the medium into position relative to the energy beam so that each of a plurality of successive regions of the repositioned medium may be imaged by the energy beam, the transport means being controllable in its movement of the medium so as to more precisely establish the positioning thereof; and
regional image registration control means responsive to the registration marks of a one imaged region of the energy-sensitive medium at a time after the medium has been moved relative to the energy beam for controlling the transport means so that positional errors in the repositioning of the medium may be reduced, and so that each successively-imaged region of the image is in better registration, one region to the next, the regional image registration control means including
a split four quadrant photodetector, affixed to the frame, for sensing the optically-recorded registration marks, and
a servomechanism, affixed to the frame, responsive to the sensed registration marks for physically moving at least one of the plurality of nip rollers so as to alter the path of the energy-sensitive medium during its repositioning.

11. The imaging apparatus registration mechanism according to claim 1 further comprising:
a clamping means for holding the energy-sensitive medium stationary relative to the energy beam and relative to the frame during the imaging of each successive region.

12. The imaging apparatus registration mechanism according to claim 11 wherein the clamping means is further for holding the energy-sensitive medium stationary relative to the energy beam and relative to the frame during the recording of the registration marks by the marking means.

13. In an imaging apparatus for imaging successive regions of an energy-sensitive medium with an energy beam, a mechanism for positionally guiding the medium into positional registration to the energy beam so that each of a plurality of successive regions of the repositioned medium may be imaged by the energy beam, the imaging apparatus positional registration mechanism comprising:
marking means for recording registration marks upon the energy-sensitive medium at a region thereof;
transport means for moving successive regions of the medium into position relative to the energy beam so that each of a plurality of successive regions of the repositioned medium may be imaged by the energy beam, the transport means being controllable in its movement of the medium so as to more precisely establish the positioning thereof;
regional image registration control means responsive to the registration marks of a one imaged region of the energy-sensitive medium at a time after the medium has been moved relative to the energy beam for controlling the transport means so that positional errors in the repositioning of the medium may be reduced, and so that each successively-imaged region of the image is in better registration, one region to the next; and
a clamping means for holding the energy-sensitive medium stationary relative to the energy beam during the imaging of each successive region, the clamping means comprising
a pressure pad that is moved into contact with, and away from, the energy-sensitive medium in order to respectively allow the medium to be held stationary, or repositioned by the transport means, relative to the energy beam.

14. A registration method, performed in an imager having a frame that moves an energy-sensitive medium stepwise in position and that exposes the energy-sensitive medium at each successive position with an energy beam, directed to positionally registering successive images successively exposed in successive regions of the medium, one image to the next, the registration method comprising:
stepwise mechanically repositioning the energy-sensitive medium relative to the frame and transversely relative to an energy beam in order that successive regions of the medium may be successively imaged with the energy beam, one region to the next; and, before each stepwise repositioning,
recording optically detectable registration marks upon the energy-sensitive medium at each imaged region thereof; and then, at a time after the medium has been repositioned relative to the frame and transversely relative to the energy beam,
optically sensing the recorded registration marks associated with a region already imaged; and, responsively to the sensed registration marks of this already-imaged region, controlling a next stepwise mechanical repositioning of the medium responsive to the sensed registration marks in order that, by this controlling, positional errors in this next stepwise mechanical repositioning of the medium may be reduced, this positional error reduction being to the effect that each successively imaged region of the image will be in better positional registration, one region to the next.

15. The registration method according to claim 14 wherein the recording of the optically detectable registration marks is with the energy beam.

16. The registration method according to claim 14 wherein the sensing of the optically detectable registration marks is optical.

17. A registration mechanism for an imaging apparatus that records an image on a photosensitive medium that displays an immediate change in at least one property upon imaging, the mechanism comprising:

a frame;

an optical stage means, affixed to the frame, for generating a signal beam producing upon the photosensitive medium (i) an image, and (ii) optically detectable registration marks;

a drive means, affixed to the frame, for stepwise positioning successive regions of the photosensitive medium relative to the frame and transversely relative to the optical stage means so that, as stepwise repositioned, the photosensitive medium may be imaged and marked in a region thereof, the drive means being controllable in its spatial repositioning of the medium;

means for optically sensing the registration marks of a previously imaged and marked region of the photosensitive medium as each new region is successively stepwise transversely positioned by the drive means relative to the optical stage means; and control means responsive to the optically sensed registration marks for controlling the drive means in its spatial repositioning of the photosensitive medium transversely relative to the signal beam in order that, by this controlling of the drive means, positional errors in the stepwise repositioning of the medium may be reduced.

* * * * *